United States Patent
Benkreira et al.

(10) Patent No.: US 10,262,319 B1
(45) Date of Patent: Apr. 16, 2019

(54) AUTOMATICALLY ACTIVATING A TRANSACTION CARD BY DETECTING A CHANGE ASSOCIATED WITH A PACKAGE THAT CARRIES THE TRANSACTION CARD

(71) Applicant: Capital One Services, LLC, McLean, VA (US)

(72) Inventors: Abdelkadar M'Hamed Benkreira, Washington, DC (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/032,970

(22) Filed: Jul. 11, 2018

(51) Int. Cl.
| | |
|---|---|
| H04W 4/38 | (2018.01) |
| E05B 73/00 | (2006.01) |
| G06Q 10/08 | (2012.01) |
| G06Q 20/34 | (2012.01) |
| G08B 13/24 | (2006.01) |
| H04W 4/029 | (2018.01) |

(52) U.S. Cl.
CPC ....... *G06Q 20/354* (2013.01); *E05B 73/0023* (2013.01); *E05B 73/0029* (2013.01); *G06Q 10/0833* (2013.01); *G08B 13/2434* (2013.01); *H04W 4/029* (2018.02); *H04W 4/38* (2018.02)

(58) Field of Classification Search
CPC ... G06Q 20/354; H04W 4/38; E05B 73/0023; E05B 73/0029; E05B 73/0052; E05B 73/0059
See application file for complete search history.

(56) References Cited

U.S. PATENT DOCUMENTS

| | | |
|---|---|---|
| 5,111,184 A | 5/1992 | Heaton et al. |
| 10,074,247 B1 * | 9/2018 | Tang ............ G08B 13/02 |
| 2002/0088855 A1 | 7/2002 | Hodes |
| | (Continued) | |

FOREIGN PATENT DOCUMENTS

WO      01/98425      12/2001

OTHER PUBLICATIONS

Sienna Kossman, "Activation sticker shock: New card may arrive already 'live'", https://www.creditcards.com/credit-card-news/card-activation-sticker-transactions.php, Mar. 11, 2016, 12 pages.

(Continued)

*Primary Examiner* — Michael J Dalbo
(74) *Attorney, Agent, or Firm* — Harrity & Harrity, LLP

(57) ABSTRACT

A first device may be implemented within a package that is for transporting a second device requiring activation. The first device may determine whether the package has been opened based on whether a trigger condition has been satisfied. The trigger condition may be satisfied when a value identifying an amount of an electrical property of a conductive structure sealing the package satisfies a first threshold value or when a value identifying an amount of a measurable property associated with the package satisfies a second threshold value. The first device may provide, to a server, a request to activate the second device based on determining that the package has been opened. The request may cause the server to initiate an activation procedure and to activate the second device if the activation procedure succeeds.

20 Claims, 11 Drawing Sheets

(56) References Cited

U.S. PATENT DOCUMENTS

| | | | |
|---|---|---|---|
| 2009/0309722 A1* | 12/2009 | Nichols | G06Q 10/08 340/541 |
| 2014/0138275 A1* | 5/2014 | Magnusson | B65D 85/00 206/459.1 |
| 2016/0063484 A1* | 3/2016 | Carpenter | G06Q 20/322 705/41 |
| 2016/0110725 A1 | 4/2016 | Bright | |
| 2017/0124789 A1* | 5/2017 | Rephlo | G06Q 10/083 |
| 2017/0161725 A1* | 6/2017 | Hosp | G06Q 20/354 |

OTHER PUBLICATIONS

Commercial Bank, "Ways to activate your Commercial Bank Debit and Credit Card", http://www.cbq .qa /en/ personal/cards/pages/ credit-card-activation.aspx, Mar. 8, 2018, 3 pages.

\* cited by examiner

130
Determine whether the package has been opened based on whether a trigger condition has been satisfied

| Package Components | First Trigger Condition |
|---|---|
| • Conductive structure: adhesive tape with copper coil<br>• Sensor capable of detecting electrical properties | • Threshold change to an electrical property of the conductive structure |

| Package Components | Other Trigger Conditions |
|---|---|
| • No conductive structure<br>• Light sensor, motion sensor, or sound sensor | • Second Trigger Condition:<br>• Threshold change to an amount of ambient light within the package<br>• Third Trigger Condition<br>• Threshold change to an amount of heat or movement within the package<br>• Fourth Trigger Condition<br>• Threshold change in sound waves associated with the package |

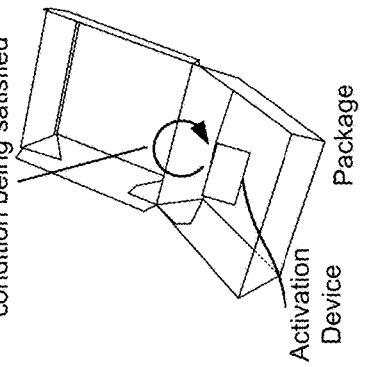

130-2
Determine that the package has been opened based on another trigger condition being satisfied Activation Device     Package

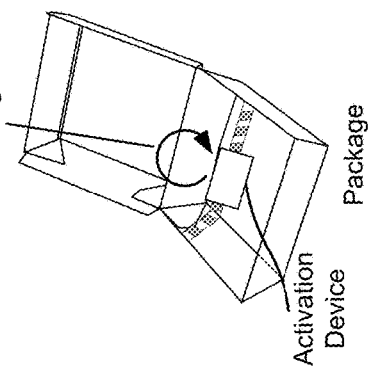

130-1
Determine that the package has been opened based on a first trigger condition being satisfied Activation Device     Package

FIG. 1C

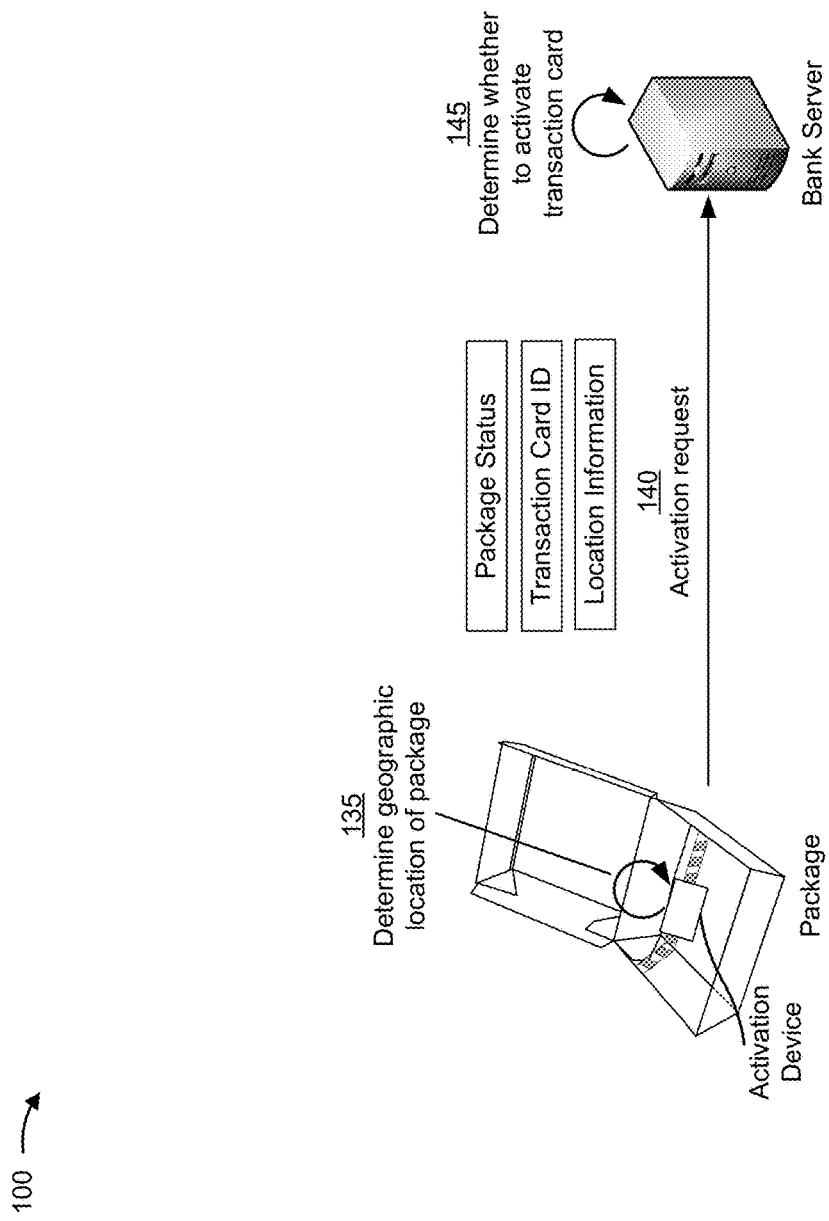

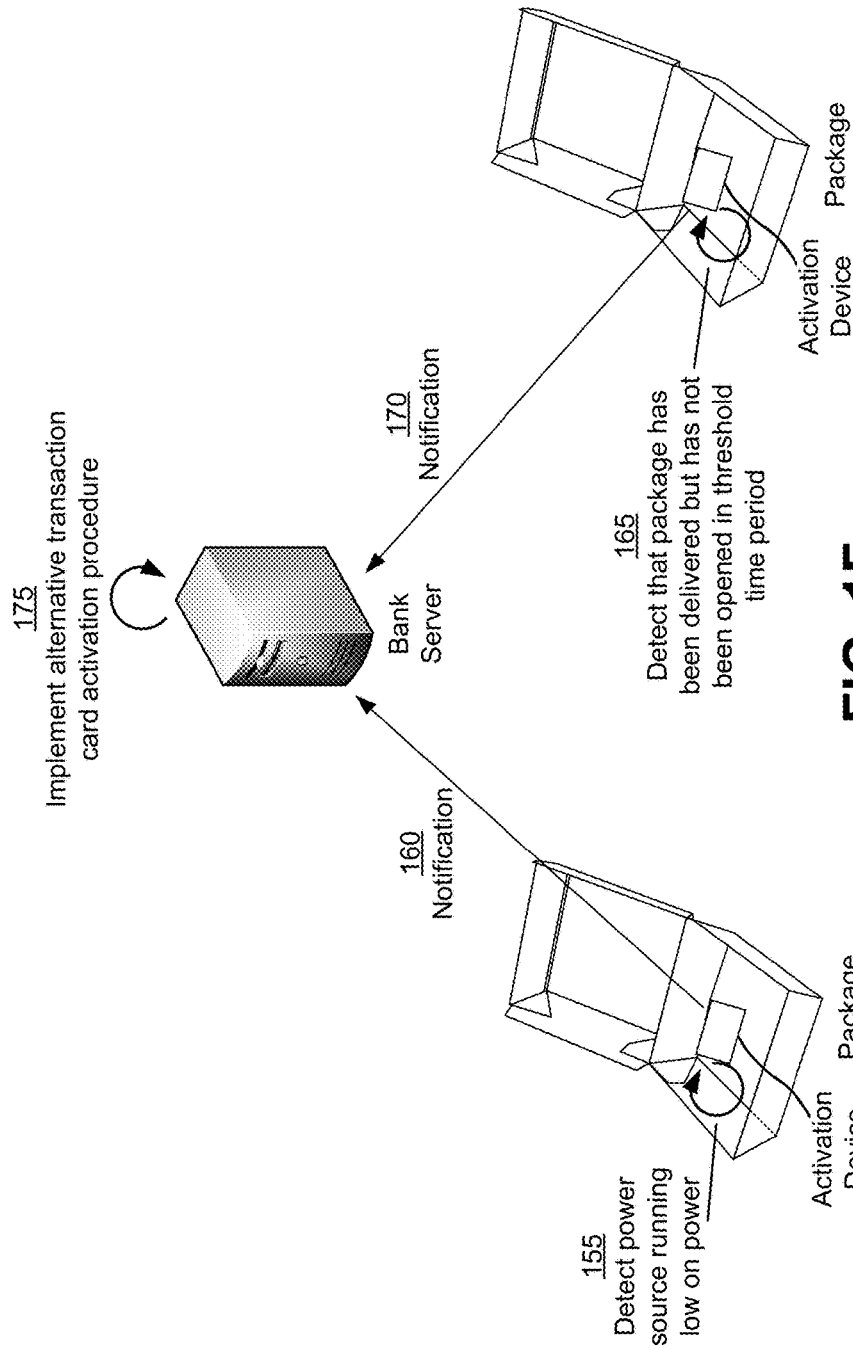

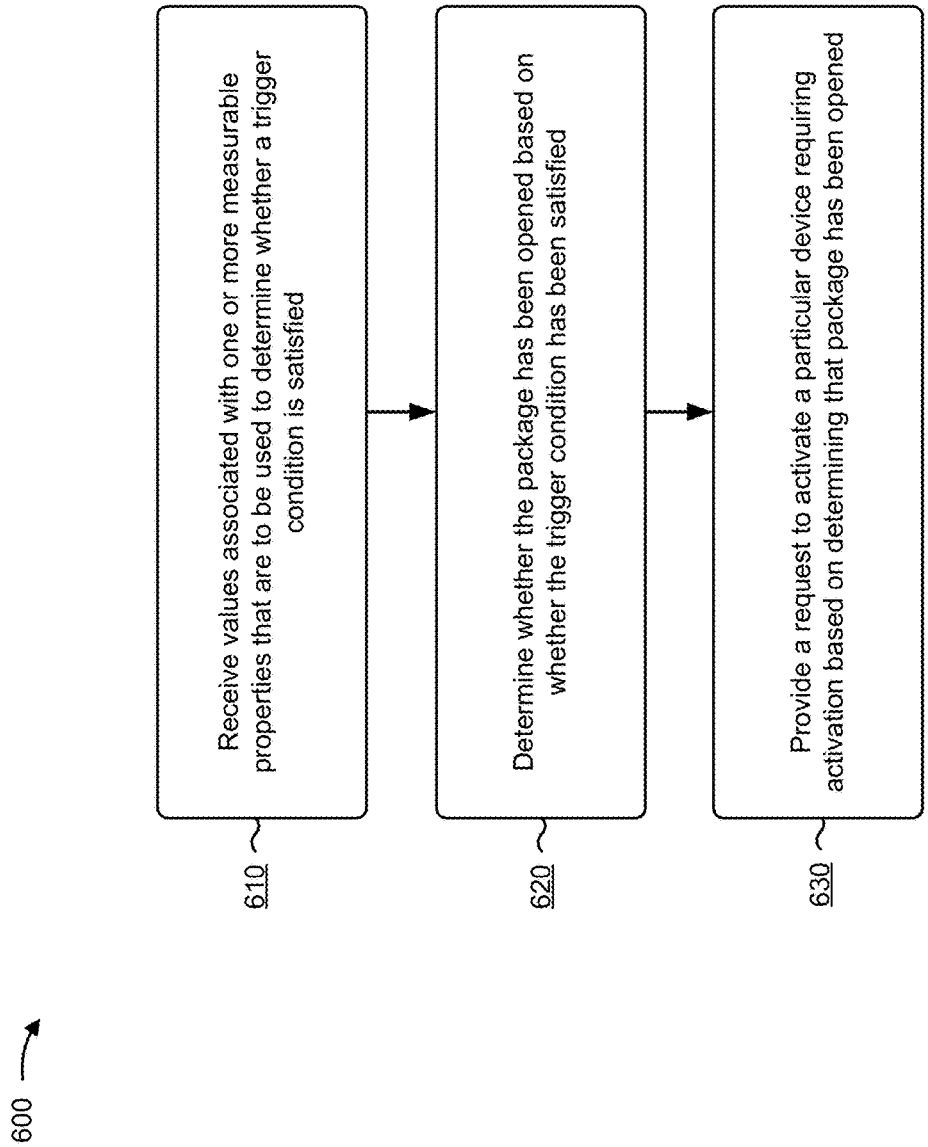

AUTOMATICALLY ACTIVATING A TRANSACTION CARD BY DETECTING A CHANGE ASSOCIATED WITH A PACKAGE THAT CARRIES THE TRANSACTION CARD

BACKGROUND

When an individual is approved for a transaction card (e.g., a credit card, a debit card, and/or the like), the transaction card may be sent to a home of the individual. For example, the transaction card may be placed into an envelope and mailed to the home of the individual, which may allow the individual to activate the transaction card by calling a phone number provided with the transaction card.

SUMMARY

According to some possible implementations, a first device may be implemented within a package, where the package may be for transporting a second device requiring activation. The first device may include a sensor for detecting a change to a condition associated with the package, a communication interface for communicating information to a remote server, one or more memories, and one or more processors that are communicatively coupled to the one or more memories. The one or more processors may determine whether the package has been opened based on whether a trigger condition is satisfied. The trigger condition may be a first trigger condition that is satisfied when there is a threshold change to an electrical property of a conductive structure sealing the package, or a second trigger condition that is satisfied when there is a threshold change to a measurable property associated with the package. The conductive structure may be communicatively connected to the one or more processors. The one or more processors may provide, to the remote server via the communication interface, a request to activate the second device based on determining that the package has been opened. Providing the remote server with the request may cause the remote server to initiate an activation procedure. The activation procedure may test a characteristic to determine whether the characteristic indicates that the second device has been received by an intended user. The request may include an identifier for the second device, and the remote server may use the identifier for the second device to activate the second device based on whether the activation procedure succeeds.

According to some possible implementations, a method may include monitoring, by a first device that is implemented within a package, for a trigger condition that is to be used as an indicator that a package has been opened. The first device may monitor for the trigger condition with a sensor or with one or more sensing elements associated with one or more processors of the first device. The package may be used to transport a second device requiring activation that has been issued to a user. The trigger condition may be a first trigger condition that is satisfied when there is a threshold change to an amount of an electrical property of a conductive structure sealing the package, or a second trigger condition that is satisfied when a value identifying an amount of a measurable property associated with the package satisfies a second threshold value. The conductive structure may be communicatively connected to the one or more processors. The method may include determining, by the first device, whether the package has been opened based on whether the trigger condition has been satisfied. The method may include providing, by the first device and to a server device, a request to activate the second device based on determining that the package has been opened. The request may be provided to the server device via a communication interface to cause the server device to execute an activation procedure to test a characteristic to determine whether the characteristic indicates that the second device has been received by an intended user. The server device may activate the second device based on whether the activation procedure succeeds.

According to some possible implementations, a package may include a holder for a particular device requiring activation that has been issued to a user. The package may be used to transport the particular device requiring activation to a location associated with the user. The package may include a device that includes a communication interface for communicating to a server device, one or more sensors capable of detecting measurable properties inside the package, one or more memories, and one or more processors that are operatively coupled to the one or more memories. The one or more processors may receive, from the one or more sensors, values associated with one or more measurable properties that are to be used to determine whether a trigger condition is satisfied. The trigger condition may be used as an indicator that the package has been opened. The one or more processors may determine whether the package has been opened based on whether the trigger condition has been satisfied. The one or more processors may provide, to the server device and by using the communication interface, a request to activate the device based on determining that the package has been opened. Receiving the request may cause the server device to initiate an activation procedure to test a characteristic to determine whether the characteristic indicates that the particular device requiring activation has been received by the user. The server device may activate the particular device requiring activation based on whether the activation procedure succeeds.

BRIEF DESCRIPTION OF THE DRAWINGS

FIGS. 1A-1F are diagrams of an example implementation described herein.

FIG. 6 is a flow chart of an example process for automatically activating a device by detecting a change associated with a package that carries the device.

DETAILED DESCRIPTION

Figure 1A:
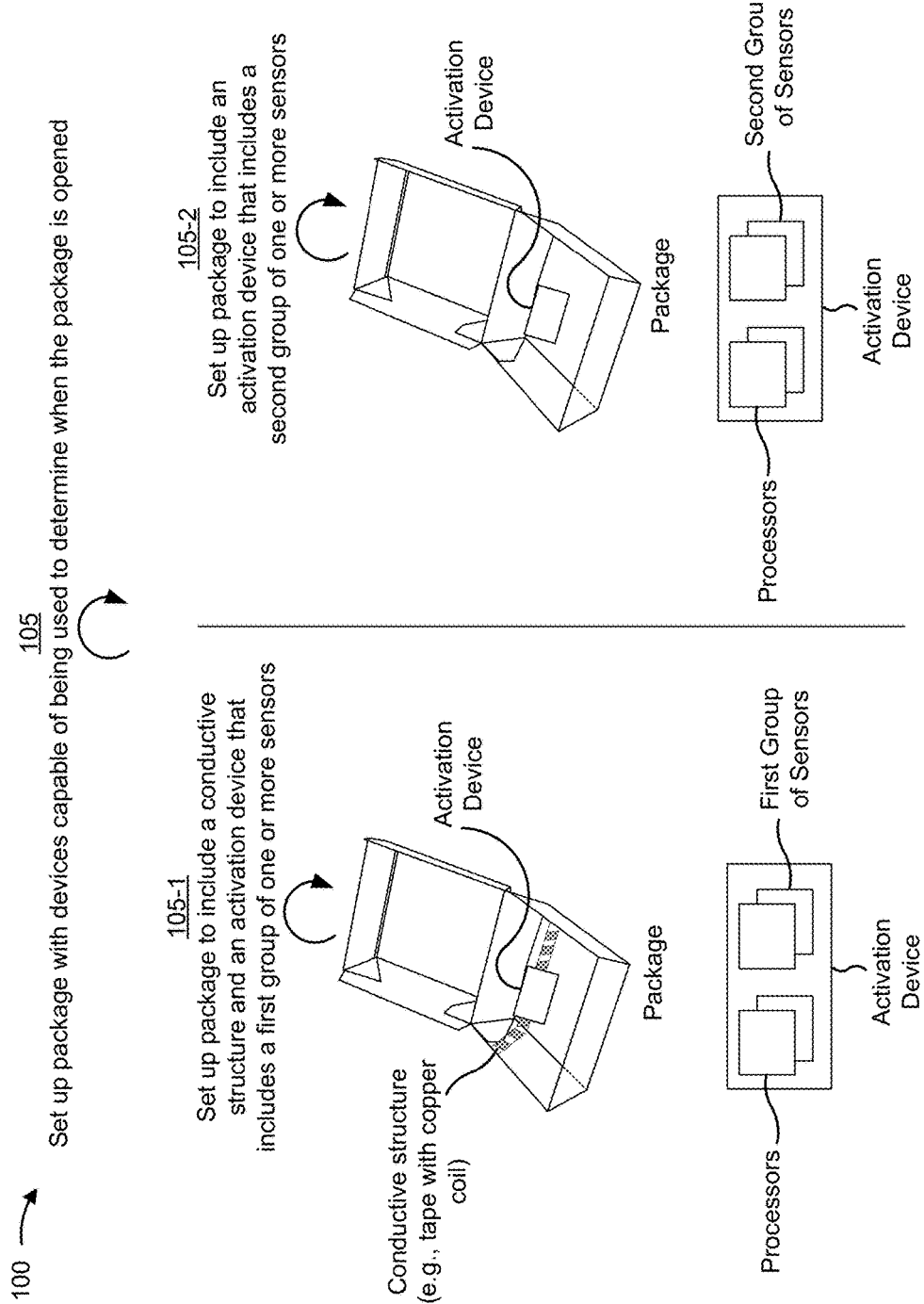

The following detailed description of example implementations refers to the accompanying drawings. The same reference numbers in different drawings may identify the same or similar elements.

When an individual is approved for a transaction card (e.g., a credit card, a debit card, and/or the like), the transaction card may be sent to the individual's home. From the time the transaction card is sent to the individual's home, to the time the individual activates the transaction card, the transaction card may be at risk of being intercepted by unauthorized users.

To reduce the risk of the transaction card being intercepted by the unauthorized users, an organization (e.g., a bank) may ship the transaction card using a plain white envelope, rather than any sort of specialized package that might signal to the unauthorized user that the package includes the transaction card. However, using the plain white envelope to ship the transaction card often requires the user to manually activate the transaction card by calling a phone number included in the envelope. In some cases, a pre-activated transaction card may be delivered to the individual's home. However, if the transaction card is pre-activated and an unauthorized user does intercept the transaction card, it may be easy for the unauthorized user to perform fraudulent transactions.

Furthermore, when an envelope is used to ship the transaction card, an unauthorized user may, without having to steal the transaction card, obtain a transaction card identifier (e.g., a debit or credit card number, an expiration date, etc.) needed to make purchases with the transaction card. For example, the unauthorized user may rub carbon paper or a similar material against the envelope to obtain an imprint of the transaction card identifier. This may allow the unauthorized user to wait for the user to activate the transaction card, at which point the unauthorized user may use the transaction card identifier to make fraudulent transactions.

Some implementations described herein provide an activation device that is implemented within a package to determine when the package has been opened, and to automatically orchestrate activation of a transaction card based on determining that the package has been opened. For example, assume that the package is to be used to deliver the transaction card to a home address of a user that has been issued the transaction card. In this case, while the package is being delivered to the user's home, the activation device may monitor for a change associated with the package, and may use the change as an indicator that the package has been opened.

As an example, the package may be sealed using a conductive structure, such as adhesive tape embedded with copper coil, and the activation device may monitor an electrical property associated with the conductive structure (e.g., current, voltage, resistance, etc.). If the conductive structure is cut (e.g., the user may cut the conductive structure to open the package, such as when the conductive structure is used to seal the package), electrical properties associated with the conductive structure may change, thereby signaling to the activation device that the package has been opened. Additional and/or alternative detection mechanisms are described herein.

After determining that the package has been opened, the activation device may provide, to a server device associated with an organization issuing the transaction card, a request to activate the transaction card. This may cause the server device to activate the transaction card.

In this way, the activation device is able to intelligently orchestrate activation of the transaction card. Additionally, the activation device conserves processing resources, network resources, and/or memory resources by deterring fraudulent interception of the transaction card. For example, the activation device may deter fraudulent interception of the transaction card by monitoring and reporting a geographic location of the package, by capturing and reporting an image of a portion of the package that has been opened (e.g., if the geographic location is not an address of the transaction card holder), and/or the like. This conserves processing resources that might otherwise be used to generate reports and/or alerts of incidents of fraud, conserves processing resources that might be used to process and/or provide reimbursements relating to incidents of fraud (e.g., to an account of a user that is victim of the fraud), and/or the like.

Additionally, the activation device conserves network resources that might otherwise be used to provide the reports or alerts of incidents of fraud to one or more devices, conserves network resources that might be used to provide reimbursements and/or notifications of reimbursement to one or more devices, and/or the like. Furthermore, the activation device conserves memory resources that might be used to store reports and/or alerts of incidents of fraud, conserves memory resources that might be used to store reimbursement information and/or notifications of reimbursements associated with fraud, and/or the like.

Additionally, because the activation device deters fraudulent interception of the package, the transaction card is able to be delivered to the user by using a package, rather than an envelope, thereby further reducing fraud by eliminating situations where an unauthorized user is able to use carbon paper or a similar material to obtain an imprint of the transaction card identifier. Furthermore, by orchestrating automatic activation of the transaction card, the activation device eliminates a need for the user to have to manually call in to activate the transaction card. This conserves network resources and/or resources that would otherwise be used when the user called in to manually activate the transaction card.

The description provided herein focuses on systems and methods for automatically activating a transaction card. In some implementations, these systems and methods may be used to activate a device other than a transaction card or software that is to execute on a device. For example, these systems and methods may be used to activate an electronic device (e.g., a media player, a computer, a computer peripheral, a smart phone, and/or the like) and/or software to be used on an electronic device. Thus, while the description to follow will relate to activating a transaction card, the description also applies to activating electronic devices and/or software.

FIGS. 1A-1F are diagrams of example implementations 100 described herein. For example, example implementations 100 may include a package that is to be used to ship a transaction card that has been issued to a user. The package may include an activation device that is able to determine when the package has been opened, and may, after determining that the package has been opened, orchestrate automatic activation of the transaction card.

As shown in FIG. 1A, and by reference number 105, the package may be set up with one or more devices that are capable of being used to determine when the package has been opened. For example, the package may be set up with a conductive structure such that opening the package causes a disturbance in one or more electrical properties of the conductive structure, as described in detail further herein. Additionally, or alternatively, the package may be set up to include an activation device that is able to use one or more sensors to detect a change associated with the package, which may serve as an indicator that the package has been opened, as described in detail further herein.

In some implementations, the package may be set up during a package manufacturing process. For example, a worker or a machine may set up the package by installing the activation device to be securely held within the package, by placing the activation device into the package and using a conductive structure to hold the activation device in place, by at least partially securing the activation device using a material that is used to form the package, and/or the like. In some implementations, the package may be set up after a user is approved for the transaction card, in a similar manner to that described above.

As shown by reference number 105-1, the package may be set up to include a conductive structure, and an activation device that includes a first group of one or more sensors. The conductive structure may be conductive adhesive tape (e.g., a tape that includes copper coil or a similar material), a conductive band, (e.g., a plastic or metal band that includes copper coil or a similar material, etc.), and/or the like.

The first group of one or more sensors may include a sensor capable of detecting electrical properties associated with the conductive structure, such as a voltage sensor, a current sensor, a resistance sensor, a capacitance sensor, and/or the like. Additionally, or alternatively, the first group of one or more sensors may include a sensor capable of measuring electrical properties associated with the conductive structure, measure changes to electrical properties associated with the conductive structure, and/or the like, as described further herein. An electrical property, as used herein, may refer to electrical current, voltage, resistance, capacitance, and/or the like.

In some implementations, the package may be set up without the first group of one or more sensors. For example, if the activation device includes a microcontroller that has one or more sensing elements that are capable of measuring electrical properties associated with the conductive structure, then sensors that are external to the microcontroller may not be needed.

As shown by reference number 105-2, the package may be set up to include the activation device, which may include a second group of one or more sensors. For example, rather than set up the package with the conductive structure, the package may be set up with an activation device that includes a second group of one or more sensors that are capable of detecting changes within or near the package. In this case, the second group of one or more sensors may include a light sensor capable of measuring ambient light inside of the package, a motion sensor capable of detecting movement inside of the package, a sound sensor capable of detecting ambient noise inside of the package, and/or the like.

In some implementations, the activation device that is placed into the package may include an additional group of sensors that are used to perform functions other than determining whether the package has been opened. For example, the activation device may include a location sensor capable of obtaining a geographic location of the activation device, an image sensor capable of capturing an image within or near the package, and/or the like, as described further herein.

While implementations described herein describe sensors as being part of the activation device, it is to be understood that in some implementations, one or more sensors described herein may be implemented outside of the activation device, and may be configured to communicate with the activation device.

In this way, the package is able to be set up to include the activation device and one or more other devices and/or components that are capable of determining when the package has been opened.

Figure 1B:
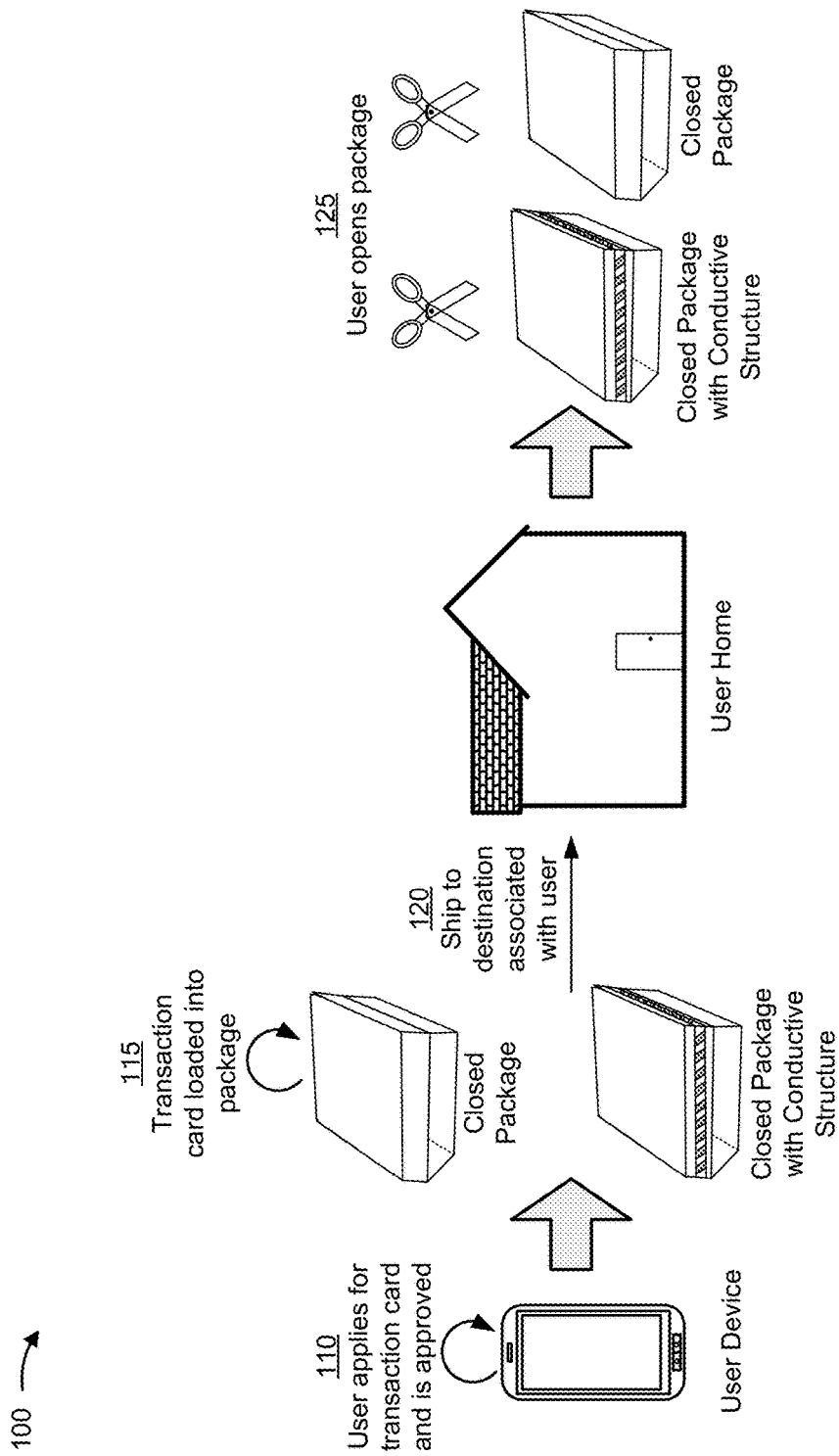

As shown in FIG. 1B, and by reference number 110, a user may apply for a transaction card, and may be approved for the transaction card. For example, the user may interact with a user device to apply for the transaction card, which may cause a backend server to process and approve the user's application. In this case, one or more devices associated with the organization issuing the transaction card may create the transaction card, such that the transaction card includes a name of the user, a transaction card identifier, an expiration date, and/or the like.

As shown by reference number 115, the transaction card may be loaded into the package. In some implementations, such as when the conductive structure is used within the package, the same conductive structure may be used to seal the outside of the package. For example, adhesive tape with copper coil may be used to seal the outside of the package. In this case, the adhesive tape may also connect to the activation device inside of the package. In some cases, the adhesive tape used to seal the package may be placed onto the package in a manner that forms a closed circuit, such that the user cutting the tape may disturb or alter electrical properties associated with the closed circuit.

As shown by reference number 120, the package may be shipped to a destination associated with the user (e.g., a home of the user). As shown by reference number 125, the user may open the package. For example, the user may use a cutting tool (e.g., scissors) to cut the adhesive tape to open the package. In some cases, such as when the conductive structure is not used, the user may be able to open the package without a cutting tool (e.g., by unfolding one or more flaps of the package).

In this way, the package may be delivered to the destination associated with the user.

As shown in FIG. 1C, and by reference number 130, the activation device may determine whether the package has been opened based on whether a trigger condition has been satisfied. For example, the activation device may include one or more processors and/or one or more sensors capable of detecting a change associated with the package. In this case, the activation device may be configured with a trigger condition associated with the change, such that a user opening the package enables the one or more sensors to detect the change, which allows the one or more processors to determine that the trigger condition has been satisfied.

In some implementations, and as shown by reference number 130-1, the activation device may determine that the package has been opened based on a first trigger condition being satisfied. For example, assume that the package includes a conductive structure such as conductive adhesive tape (e.g., tape that includes copper coil), and a sensor that is capable of detecting electrical properties, such as a voltage sensor to detect voltage, a current sensor to detect current, a resistance sensor to detect resistance, and/or the like.

In this case, the activation device may be configured with a first trigger condition that is satisfied when there is a threshold change to an electrical property of the conductive adhesive tape. For example, before the user cuts the conductive adhesive tape, the activation device may permit current to flow through the conductive adhesive tape, thereby causing electrical signals that are detectable by the sensor to flow through the conductive adhesive tape. Additionally, after the user cuts the conductive adhesive tape to open the package, current flow through the conductive adhesive tape may be severed or reduced, thereby causing a disruption to the electrical properties that is also detectable by the sensor. For example, after the conductive adhesive tape is cut, the sensor may perform a measurement on electrical properties associated with the conductive adhesive tape. This may allow the one or more processors to compare a value determined from the measurement and previously configured or received values of measurements to determine whether a threshold change to a particular electrical property has been satisfied.

As a particular example, a voltage sensor may measure a first voltage value (e.g., measured before the conductive adhesive tape is cut). Additionally, the voltage sensor may measure a second voltage value (e.g., measured after the conductive adhesive tape is cut, which may cause a decrease in voltage). Furthermore, the one or more processors may compare the first voltage value and the second voltage value, and may determine that a difference between the first voltage value and the second voltage value satisfies a threshold change in voltage associated with the conductive adhesive tape.

In some implementations, the conductive adhesive tape may be placed within the package in a manner that creates a closed circuit. In this case, the user cutting the conductive adhesive tape may cause a change in an electrical property of the conductive adhesive tape, which change may be detected by the sensor.

In some implementations, rather than using the sensor, the activation device may use the one or more processors to detect electrical properties associated with the conductive structure. For example, the activation device may include a microcontroller with one or more sensing elements that are capable of detecting electrical properties associated with the conductive structure. As an example, the microcontroller may include a sensing element that can detect voltage (e.g., an analog voltage sensor embedded within the microcontroller), and may include one or more programmable input/output terminals that may be used to provide the voltage values to the central processing unit (CPU) of the microcontroller.

In some implementations, and as shown by reference number 130-2, the activation device may determine that the package has been opened based on another trigger condition being satisfied. For example, assume that the package does not include a conductive structure, and that the package includes a light sensor to detect ambient light, a motion sensor to detect heat or movement, or a sound sensor to detect sound waves. In this case, the activation device may be configured with another trigger condition that is satisfied when a threshold change to a measurable property associated with the package is detected. A measurable property may be a property in or around the package that is measurable by one or more sensors described herein, such as measurable properties relating to ambient light, sound, motion, heat, and/or the like, as described further herein.

As shown as an example, the activation device may be configured with a second trigger condition that is satisfied when there is a threshold change to an amount of ambient light within the package. For example, the inside of the package may not have ambient light while the package is closed or may have a small amount of ambient light, and may have a higher amount of ambient light when the package is opened.

In this case, the light sensor (e.g., a photovoltaic cell) may detect ambient light when the package is opened, and may convert the ambient light to electrical signal values (e.g., using semiconducting materials that exhibit the photovoltaic effect). This may allow the one or more processors to compare the electrical signal values and previously configured or received electrical signal values to determine whether there is a threshold change of an amount of ambient light within the package. The previously configured or received electrical signal values may be configured into memory of the activation device, may be received based on previous measurements made by the light sensor (e.g., the light sensor may be configured to detect ambient light periodically), and/or the like.

As shown as another example, the activation device may be configured with a third trigger condition that is satisfied when there is a threshold change to an amount of heat or movement within the package. For example, while the package is closed, there may not be movement or heat inside of the package. Additionally, when the package is opened, new motion signals or heat signals may be created based on the user reaching into the package for the transaction card.

In this case, the motion sensor (e.g., a passive infrared (PIR) sensor, a heat sensor, etc.) may detect the new heat signals or the new motion signals when the package is opened, and may convert the new heat signals or the new motion signals to electrical signal values. This may allow the one or more processors to compare the electrical signal values and previously configured or received electrical signal values to determine whether there is a threshold change of an amount of heat or movement within the package. The previously configured or received electrical signal values may be configured into memory of the activation device, may be received based on previous measurements made by the motion sensor, and/or the like.

As shown as another example, the activation device may be configured with a fourth trigger condition that is satisfied when there is a threshold change in sound waves associated with the package. For example, before the package is opened, sound waves may not travel through the inside of the package, or, if sound waves travel through the package, the sound waves may have a low volume (small amplitude) as a result of the closed package reducing the strength of the sound waves that travel through the package. Additionally, when the package is opened, new sound waves may be created by the user opening the package, reaching into the package, speaking while near the package, and/or the like, and the new sound waves may have a higher volume (larger amplitude) as a result of the package being opened. In this case, the sound sensor (e.g., a microphone, etc.) may detect the new sound waves, and may convert the new sound waves into electrical signal values. This may allow the one or more processors to compare the electrical signal values and one or more previously configured or received electrical signal values to determine whether there is a threshold change in sound waves associated with the package.

In some implementations, one or more of the above-mentioned trigger conditions may be utilized using an absolute value threshold instead of a threshold change as between two values. Additionally, or alternatively, the activation device may use one or more configurable values as values used for the trigger condition thresholds. For example, the activation device may store a configured electrical signal value that is associated with a threshold amount of sound volume. The configured electrical signal value may be used to differentiate between sound waves within the package while the package is closed and sound waves within the package while the package is open. In this case, the sound sensor may detect sound waves inside of the package, and may convert the sound waves into electrical signal values. Additionally, the one or more processors may compare the electrical signal values to the configured electrical signal value to determine whether the electrical signal values satisfy the threshold amount of sound volume. In some implementations, one or more conversions, described as being performed by sensors, may be performed by the one or more processors of the activation device.

While implementations described herein show four different trigger conditions and methods for detecting each trigger condition, it is to be understood that the four trigger conditions are provided merely by way of examples. As such, in some implementations, different trigger conditions and ways to detect the trigger conditions may be utilized. For example, a package may be set up with magnetic flaps, and a sensor may be used that is able to detect a change in magnetism associated with the package.

In some implementations, any combination of the above-mentioned trigger conditions may be implemented by the activation device. In some implementations, one or more of the sensors described above may be implemented separate from the activation device (e.g., as a separate device within the package).

In this way, the activation device is able to determine whether the package has been opened based on whether a trigger condition has been satisfied.

As shown in FIG. 1D, and by reference number 135, the activation device may determine a geographic location of the package. For example, the activation device may determine the geographic location of the package using a location sensor, a global positioning system (GPS) tracking unit, or a similar device that includes components capable of being used to determine location (e.g., an antenna, a transmitter, a receiver, etc.). In this case, the location sensor or the GPS tracking unit may be used to track the package's movements, at intervals, and may perform one or more calculations to determine the geographic location of the package. Additionally, the location sensor or the GPS tracking unit may provide data identifying the geographic location of the package to the one or more processors of the activation device.

As shown by reference number 140, the activation device may provide, to a bank server, a request to activate the transaction card. For example, the activation device may provide the request using a short message service (SMS) message, using an application programming interface, and/or the like. The request may include the data identifying the geographic location of the package, data identifying a transaction card identifier for the transaction card in the package, data identifying a status of the package (e.g., whether the package is opened or closed, a time stamp indicating when the package was opened, etc.), and/or the like.

As shown by reference number 145, the bank server may determine whether to activate the transaction card. For example, the bank server may, upon receiving the request, execute an activation procedure to test a characteristic to determine whether the characteristic indicates that the transaction card has been received by the user. The characteristic may be a geographic location of the package, an authentication code that is received from the user device, voice data received from the activation device to verify that the user is present at the location at which the package has been opened, and/or the like.

In some implementations, the bank server may execute a first activation procedure to determine whether a geographic location of the package matches an intended delivery location. For example, the bank server may receive, as part of the request, data identifying the geographic location of the package. In this case, the bank server may compare the data identifying the geographic location of the package and location data for the intended delivery location (e.g., a home of the user, an address indicated by the user when the transaction card was approved, etc.). The bank server may activate the transaction card if the data identifying the geographic location of the package matches the location data for the intended delivery location (or satisfies a threshold level of similarity with the location data for the intended delivery location).

In this case, the characteristic may be determined using a GPS tracking unit of the user device (e.g., a smartphone, a smart card, etc.). Additionally, or alternatively, the characteristic may be determined using a GPS tracking unit located within the package (e.g., that is part of the activation device, that is external to the activation device but included within the package, etc.). Additionally, or alternatively, the characteristic may be determined from a triangulation of a transmission location.

In some implementations, the bank server may execute a second activation procedure to determine whether an authentication code received from the user device matches a configured authentication code. For example, when the activation device detects that the package has been opened, the activation device may cause an activation code to be provided to the user device (e.g., by transmitting the authentication code to the user device using a communication interface, by requesting a server device to transmit the authentication code to the user device, etc.). In this case, the user may interact with the user device to enter the activation code into an interface used to verify that the user is present upon delivery of the package, which may cause the authentication code to be provided to the bank server. Additionally, the bank server may verify that the correct authentication code has been provided and may activate the transaction card based on whether the verification succeeds.

In some implementations, the bank server may execute a third activation procedure to determine whether voice data recorded by the activation device matches configured voice data of the user. For example, when the activation device detects that the package has been opened, the activation device may use a speaker system or an audio system to broadcast instructions requesting that an individual opening the package please make a verbal statement (e.g., "I am the user authorized to open this package"). When the user makes the verbal statement, the speaker system or the audio system may convert the sound waves into voice data and may provide the voice data to the bank server. Additionally, the bank server may verify the voice data, and may activate the transaction card based on whether the verification succeeds.

In this way, the activation device is able to provide the bank server with an activation request to allow the bank server to execute the activation procedure to determine whether to activate the transaction card.

Figure 1E:
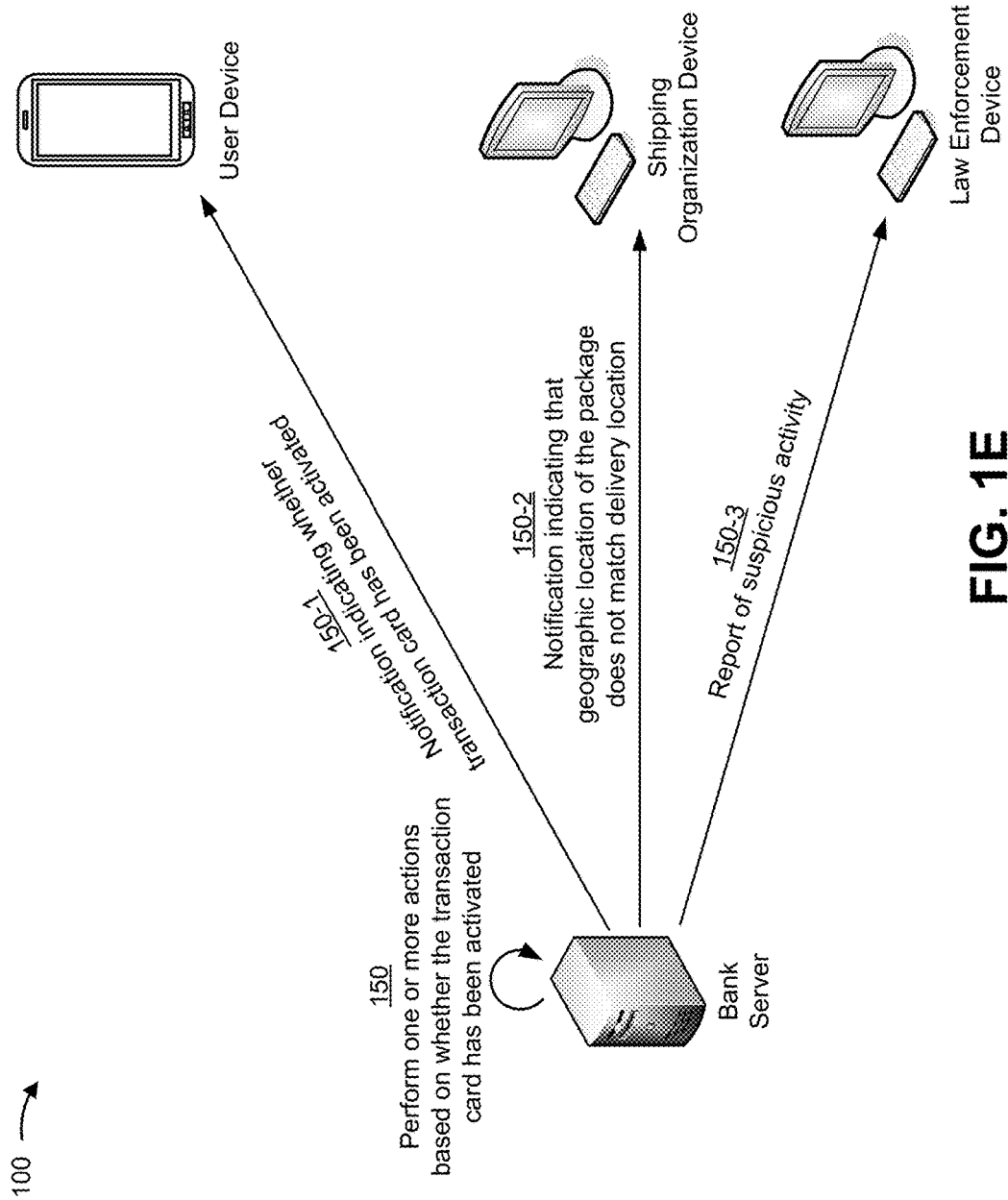

As shown in FIG. 1E, and by reference number 150, the bank server may perform one or more actions based on whether the transaction card has been activated. For example, as shown by reference number 150-1, the bank server may generate and provide a notification to the user device that indicates whether the transaction card has been activated. The notification may be provided via a voice message, via an SMS message, via an e-mail account of the user, and/or the like. In some cases, such as when the transaction card is unable to be activated, the bank server may generate a notification that also provides the user with instructions for an alternative activation procedure (e.g., by calling a 1-800 number to activate the transaction card in a conventional manner).

In some implementations, the bank server may provide the notification to the activation device, which may cause the activation device to provide an audible notification or a visual display of the notification. For example, the activation device may include a speaker system that is able to provide an audible notification to allow a user to hear whether the transaction card has been activated. As another example, the activation device may include a display system that is able to provide a visual display of the notification (e.g., using a user interface), such that the user is able to read the notification to learn whether the transaction card has been activated. In some cases, the transaction card may have a speaker or display capability that is able to perform one or more of the above implementations.

As another example, and as shown by reference number 150-2, the bank server may generate and provide, to a device associated with a shipping organization, a notification indicating that the geographic location of the package does not match the delivery location. This may allow the shipping organization to check on whether a mistake was made during the shipping process. In some cases, the notification may be provided prior to the package being shipped to an incorrect destination, thereby giving the shipping organization time to correct the error prior to the package reaching the incorrect destination.

As shown by reference number 150-3, if the bank server is unable to activate the transaction card, the bank server may generate and provide a report of suspicious activity to a device associated with a law enforcement agency. For example, the bank server may generate a report indicating the geographic location of the package (e.g., which is different than the delivery destination), a time at which the package has been opened, and/or any other information that the activation device collected that may aid in identifying an individual opening the package. As an example, the activation devices sensors may be used to capture a photograph of the individual opening the package, may detect audio that may be used to identify the individual opening the package, and/or the like.

In this way, the activation device and the bank server are able to perform actions associated with notifying the user that the transaction card has been opened and/or perform actions associated with alerting law enforcement of suspicious activity relating to the opening of the package. Furthermore, the activation device is able to deter fraudulent interception of the package by monitoring a geographic location of the package, by taking a photograph of a user that opens the package, by recording sound around the package, by providing reports of suspicious activity to devices associated with law enforcement agencies, and/or the like. This conserves processing resources, network resources, and/or memory resources that might otherwise be used to handle fraudulent transactions (e.g., resources need to generate reports of fraud, notify users of fraud, provide reimbursements to accounts victimized by fraud, etc.).

As shown in FIG. 1F, the activation device and/or the bank server may be configured to handle scenarios where the package is not opened within a threshold time period. For example, the activation device may have a power source (e.g., a battery) with enough power to last until the package has been delivered and opened (e.g., two weeks, three weeks, etc.), but the user may not be able to open the package prior to the power source running out of power.

As shown by reference number 155, the activation device may be configured to detect when the power source is running out of power. For example, the activation device may periodically monitor power levels of the power source to determine whether a power level has dropped below a threshold power level. As shown by reference number 160, the activation device may provide a notification indicating that the power source is low to the bank server. This may allow the bank server to implement an alternative transaction card activation procedure to ensure the transaction card is activated, as described further herein.

As shown by reference number 165, the activation device may be configured to detect that the package has been delivered but has not been opened within a threshold time period. For example, the activation device may determine that the package has been delivered by periodically determining a geographic location of the package or by receiving a notification from the bank server that the package has been delivered. In this case, the activation device may periodically compare a current time and a delivery time (e.g., a time at which the package had been delivered). If the difference between the current time and the delivery time satisfies the threshold time period, the activation device may, as shown by reference number 170, generate and provide a notification to the bank server indicating that the package has yet to be opened.

As shown by reference number 175, the bank server may implement an alternative transaction card activation procedure based on receiving the notification. For example, the bank server may automatically activate the transaction card (e.g., without the package being opened), schedule a customer service representative to call the user to activate the transaction card, provide instructions to the user device on how to manually activate the transaction card, and/or the like.

To provide an example, the bank server may activate the transaction card without the package being opened. In this example, in addition to providing the bank server with the notification, the activation device may also provide the bank server with the geographic location of the package. Additionally, the bank server may use the geographic location of the package to verify that the package has arrived at the delivery destination, which may allow the bank server to automatically activate the transaction card. This action may be viable when the user indicates that the delivery location includes a secure place to store packages (e.g., the package may fit into a mail slot at a user's home, and remain behind a locked door). This conserves network resources that would otherwise be used by the user having to call to activate the transaction card.

In some implementations, the activation device may selectively power on or off components based on receiving instructions from the bank server. For example, assume the user is notified when the package is delivered, and the user responds to the notification by indicating that the user will not be home for another ten days. In this case, the bank server may provide instructions to the activation device to power off or put to sleep certain components (e.g., the one or more sensors), such that components are not needlessly wasting power resources during the time period that the user is unable to open the package.

In this way, the activation device is able to intelligently orchestrate activation of the transaction card. Additionally, the activation device reduces fraud, improves customer service, and conserves resources (e.g., processing resources, network resources, memory resources, etc.) that would otherwise be needed to manually activate the transaction card, conserves resources that would otherwise be needed to process reports of fraudulent transactions, conserves resources that would otherwise be used to perform needless checks for whether the package has been opened (e.g., which may be eliminated by selectively powering on or off components based on instructions from the bank server), and/or the like.

As indicated above, FIGS. 1A-1F are provided merely as examples. Other examples are possible and may differ from what was described with regard to FIGS. 1A-1F. For example, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of example implementations 100 may perform one or more functions described as being performed by another set of devices of example implementations 100.

Figure 2:
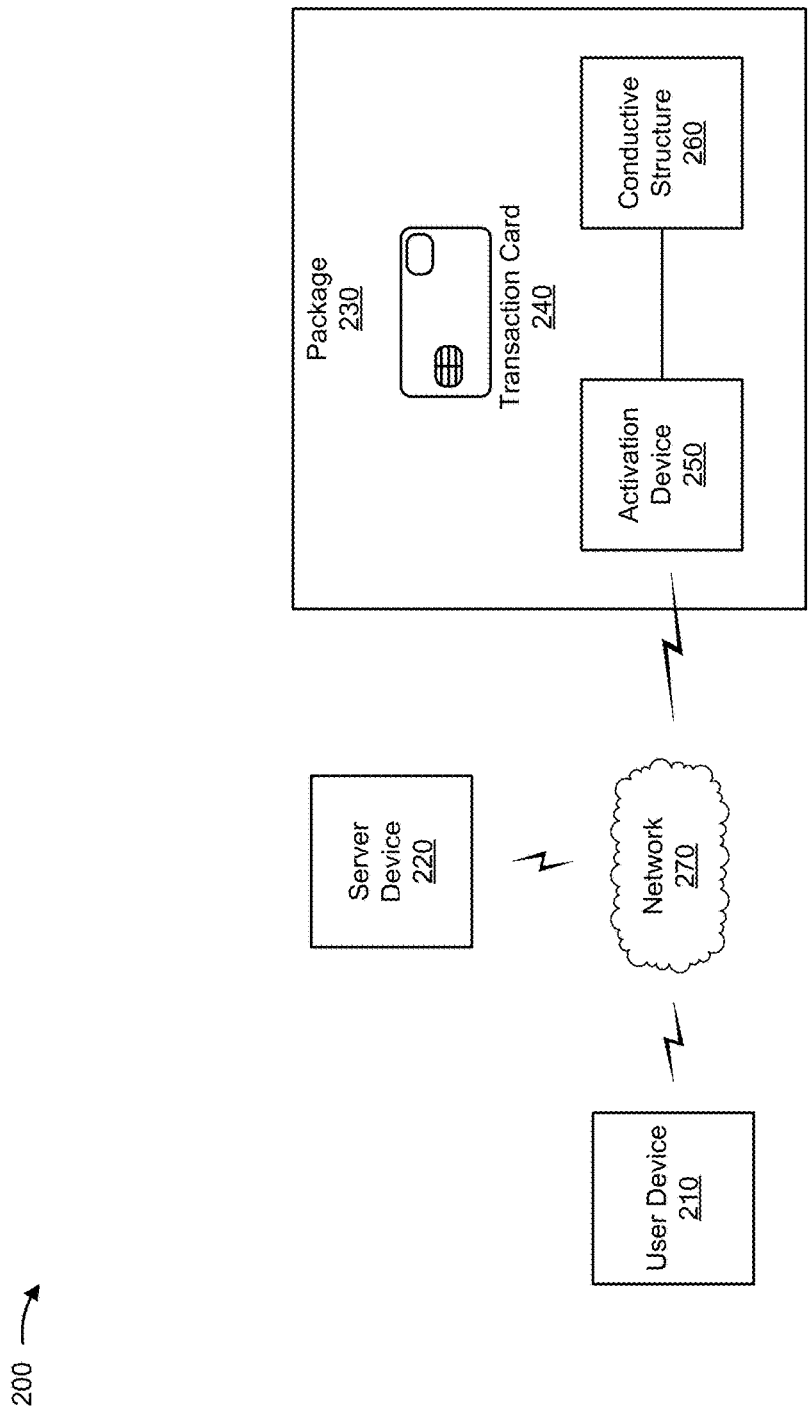
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, a package 230, a transaction card 240, an activation device 250, a conductive structure 260, and/or a network 270. Devices of environment 200 may interconnect via wired connections, wireless connections, or a combination of wired and wireless connections.

User device 210 includes one or more devices capable of receiving, storing, generating, processing, and/or providing information associated with transaction card 240. For example, user device 210 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, user device 210 may provide information associated with an application for transaction card 240 to server device 220 or another device. In some implementations, user device 210 may receive, from server device 220 or another device, a notification indicating whether the user has been approved for transaction card 240. In some implementations, user device 210 may receive, from server device 220, a notification indicating whether transaction card 240 has arrived at a destination associated with the user (e.g., the user's home or business). In some implementations, user device 210 may receive, from server device 220, a notification indicating whether transaction card 240 is activated.

Server device 220 includes one or more devices capable of receiving, storing, generating, processing, and/or providing information associated with transaction card 240. For example, server device 220 may include one or more server devices (e.g., one or more on-site servers, one or more cloud-based servers, etc.), and/or similar types of devices. In some implementations, server device 220 may be a remote server or backend server operating on behalf of an organization issuing transaction card 240 (e.g., a bank, a financial institution, etc.). In some implementations, server device 220 may provide, to a device associated with a law enforcement agency, a report that includes information describing suspicious activity associated with delivery of transaction card 240.

Package 230 includes a package capable of being used to transport transaction card 240, activation device 250, and/or conductive structure 260. For example, package 230 may include a cardboard box made out of corrugated fiberboard, a plastic box, a wooden box, a metallic box, and/or the like. In some implementations, package 230 may include one or more internal structural components, such as a holder capable of holding items in place that are stored by package 230 (e.g., transaction card 240, activation device 250, etc.).

Transaction card 240 includes a transaction card capable of receiving, storing, generating, and/or providing information associated with an activation procedure. Transaction card 240 is capable of storing and/or communicating data for a point of sale (PoS) transaction with a transaction terminal, data for access to a secure area, data for an online transaction, and/or the like. For example, transaction card 240 may store or communicate data including account information (e.g., an account identifier, a cardholder identifier, etc.), expiration information of transaction card 240, banking information, transaction information (e.g., a payment token), and/or the like. For example, to store or communicate the data, transaction card 240 may include a magnetic strip and/or an integrated circuit (IC) chip (e.g., a EUROPAY®, MASTERCARD®, VISA® (EMV) chip, or the like). In some implementations, transaction card 240 may be activated by receiving instructions from server device 220 or from a different server device capable of generating and providing instructions to activate transaction card 240.

Activation device 250 includes one or more devices capable of receiving, storing, generating, processing, and/or providing information associated with package 230 and/or transaction card 240. For example, activation device 250 may include a computing device and/or a communication device, such as a minicomputer, a smart device, and/or a similar type of device. In some implementations, activation device 250 may determine whether package 230 has been opened, using one or more components described further herein (see, e.g., FIG. 3). In some implementations, activation device 250 may provide a request to activate transaction card 240 to server device 220. In some implementations, activation device 250 may provide, to server device 220, location information identifying a geographic location of activation device 250. In some implementations, activation device 250 may provide, to server device 220, a notification indicating that a power source of activation device 250 is depleting.

Conductive structure 260 includes one or more structures capable of being used to determine that package 230 has been opened. For example, conductive structure 260 may be a conductive tape, a conductive band, a conductive object of a particular material (e.g., plastic, metal, etc.), a tape, band, and/or object with adhesive properties, and/or the like. In some implementations, conductive structure 260 may be used to seal package 230. In some implementations, conductive structure 260 may be attached to activation device 250. In some implementations, conductive structure 260 may be attached to activation device 250 such that a closed circuit connection is formed.

Network 270 includes one or more wired and/or wireless networks. For example, network 270 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a public area network (PAN), such as one enabling Bluetooth communication, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
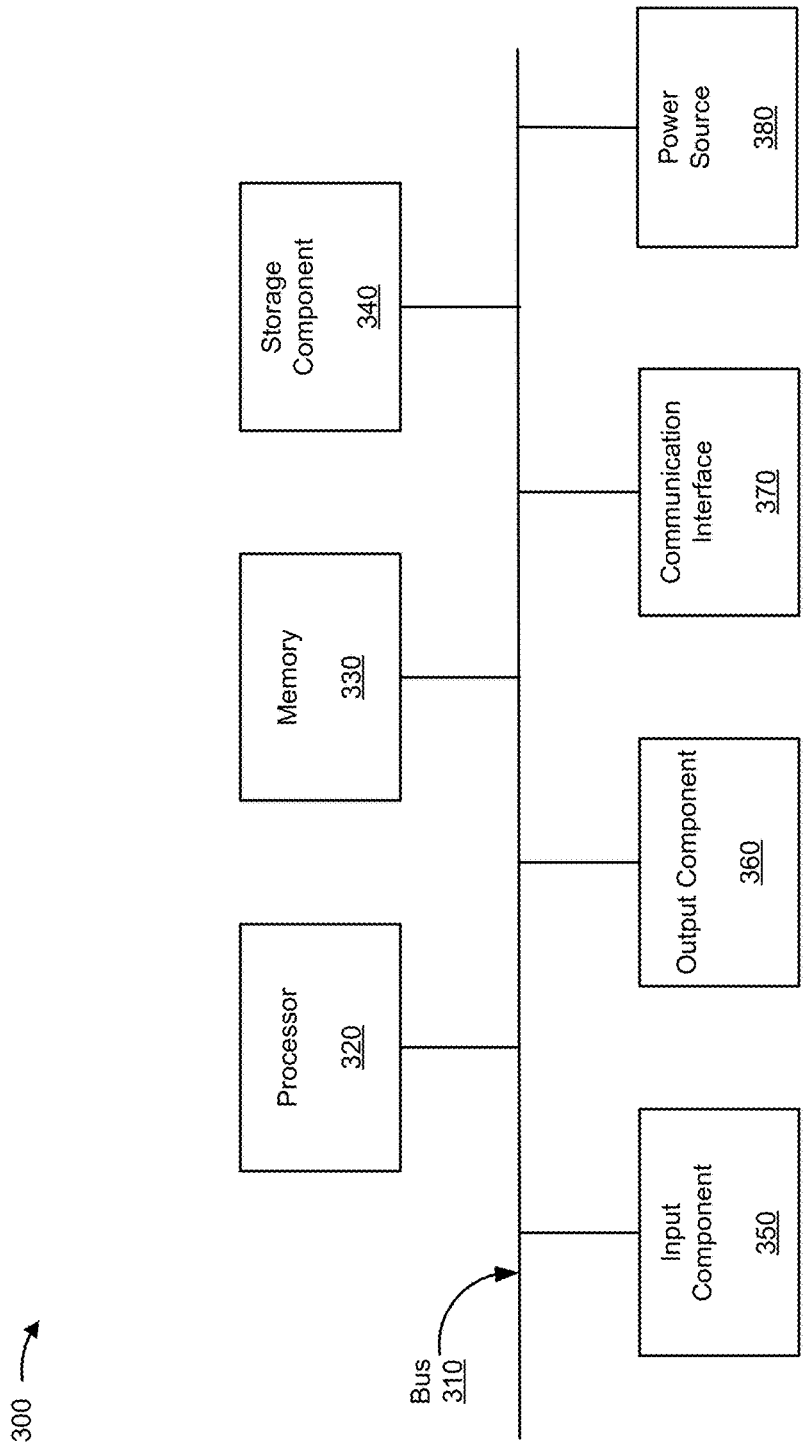
FIG. 3 is a diagram of example components of one or more devices of FIG. 2.

FIG. 3 is a diagram of example components of a device 300. Device 300 may correspond to user device 210, server device 220, transaction card 240, and/or activation device 250. In some implementations, user device 210, server device 220, transaction card 240, and/or activation device 250 may include one or more devices 300 and/or one or more components of device 300. As shown in FIG. 3, device 300 may include a bus 310, a processor 320, a memory 330, a storage component 340, an input component 350, an output component 360, a communication interface 370, and a power source 380.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information, such as a sensor capable of sensing electrical properties (e.g., a voltage sensor, a current sensor, a resistance sensor, etc.), a location sensor (e.g., using an antenna, a receiver, a transmitter, etc.), a light sensor (e.g., a photovoltaic cell, etc.), a motion sensor (e.g., a passive infrared (PIR) sensor, a heat sensor, etc.), a sound sensor (e.g., a microphone, etc.), and/or the like. In some cases, one or more of the above-mentioned sensors may be supported as an independent device, and may be configured to communicate with activation device 250 or another device. Output component 360 includes a component that provides output information from device 300 (e.g., a display system, a speaker system, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Power source 380 includes one or more components that provide power to device 300. For example, power source 380 may include a battery, a power source capable of providing direct current (DC), a power source capable of providing alternating current (AC), a programmable power source, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
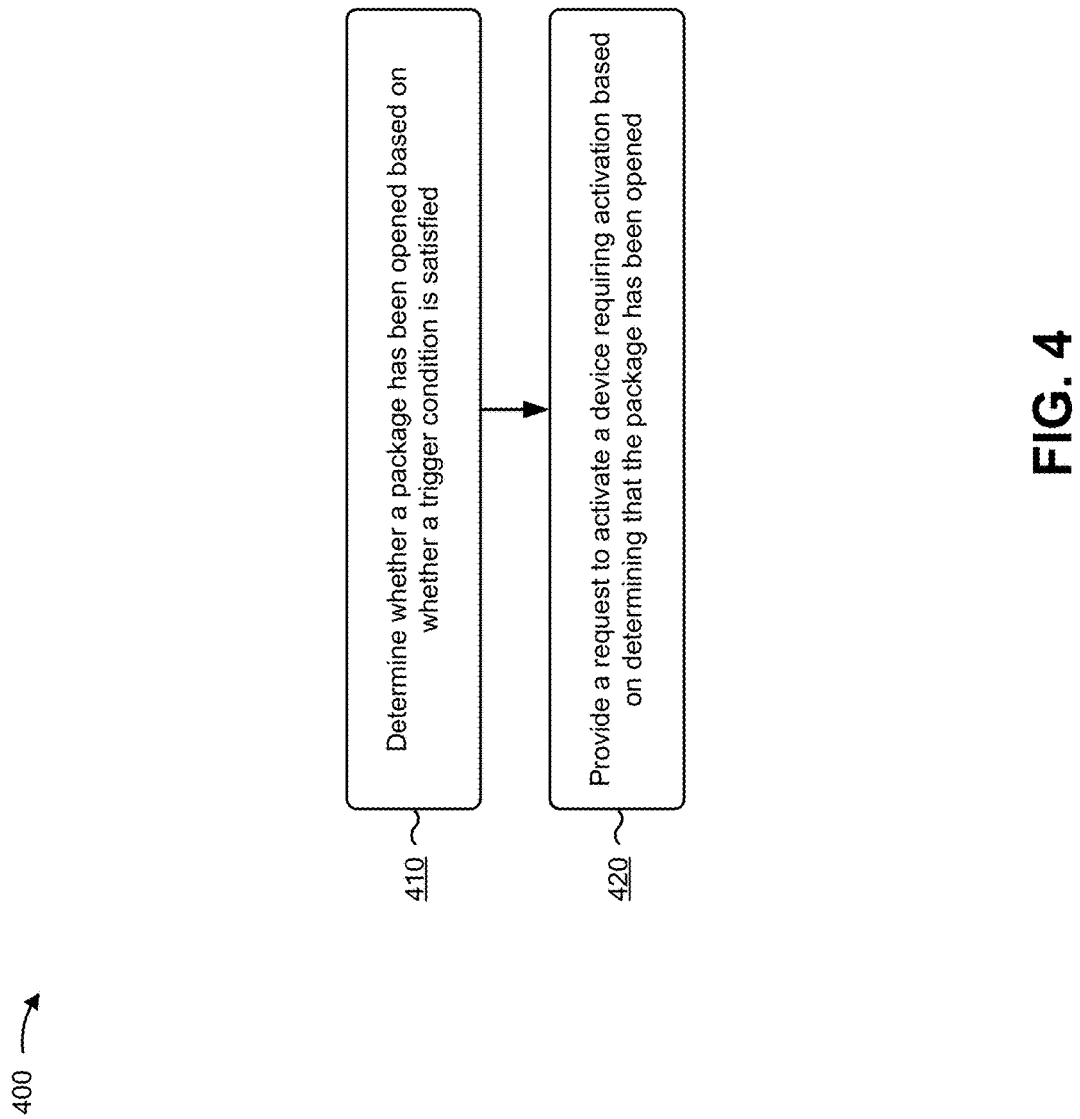
FIG. 4 is a flow chart of an example process for automatically activating a device by detecting a change associated with a package that carries the device.

FIG. 4 is a flow chart of an example process 400 for automatically activating a device by detecting a change associated with a package that carries the device. In some implementations, one or more process blocks of FIG. 4 may be performed by a first device (e.g., activation device 250, using processor 320, input component 350, output component 360, communication interface 370, etc.). In some implementations, one or more process blocks of FIG. 4 may be performed by another device or a group of devices separate from or including the first device, such as a user device (e.g., user device 210), a remote server (e.g., server device 220), and/or a second device requiring activation, such as a transaction card (e.g., transaction card 240).

In some implementations, the first device may be implemented within a package (e.g., package 230), where the package transports the second device. In some implementations, the first device may include a sensor for detecting a change to a condition associated with the package, a communication interface for communicating information to the remote server, one or more memories, and one or more processors communicatively coupled to the one or more memories.

As shown in FIG. 4, process 400 may include determining whether a package has been opened based on whether a trigger condition is satisfied (block 410). For example, the first device may determine whether the package has been opened based on whether a trigger condition is satisfied, as described above with respect to FIGS. 1A-1F. In some implementations, the trigger condition may be a first trigger condition that is satisfied when there is a threshold change to an electrical property of a conductive structure sealing the package, or a second trigger condition that is satisfied when there is a threshold change to a measurable property associated with the package. In some implementations, the conductive structure may be communicatively connected to the one or more processors.

As further shown in FIG. 4, process 400 may include providing a request to activate the second device (i.e., a device requiring activation) based on determining that the package has been opened (block 420). For example, the first device may provide, to the remote server via the communication interface, a request to activate the second device based on determining that the package has been opened, as described above with respect to FIGS. 1A-1F.

In some implementations, providing the remote server with the request may cause the server to initiate an activation procedure. The activation procedure may test a characteristic to determine whether the characteristic indicates that the second device has been received by an intended user. The intended user may be an individual that has been issued the second device, an individual with permission to access the second device, and/or the like. In some implementations, the request may include an identifier for the second device. In some implementations, the remote server may use the identifier for the second device to activate the second device based on whether the activation procedure succeeds.

Process 400 may include additional implementations, such as any single implementation or any combination of implementations described below and/or in connection with one or more other processes described elsewhere herein.

In some implementations, the first device may include a location sensor. Additionally, the one or more processors may receive, from the location sensor, data identifying a geographic location of the package after determining that the package has been opened. In this case, determining that the package has been opened may cause the location sensor to obtain the data identifying the geographic location of the package and to provide the data identifying the geographic location of the package to the one or more processors of the first device. Additionally, the one or more processors, when providing the request to activate the second device, may provide the request to activate the second device to the remote server, wherein the request includes the data identifying the geographic location of the package. Furthermore, providing the server device with the request may cause the server device to execute the activation procedure to compare the data identifying the geographic location of the package and data identifying a destination for the package to determine whether the package has been opened at an intended location and to activate the second device if the package has been opened at the intended location.

In some implementations, the one or more processors may permit current to flow through the conductive structure. Additionally, the one or more processors may receive, from the sensor, a value indicating an amount of the electrical property associated with the conductive structure. The amount of the electrical property may be an amount of electrical current flow, an amount of voltage, an amount of resistance, or an amount of capacitance. Additionally, the one or more processors may determine that the value indicating the amount of the electrical property satisfies the threshold change to the electrical property of the conductive structure. The threshold change to the electrical property may cause the first trigger condition to be satisfied. Additionally, the one or more processors may determine that the package has been opened based on the first trigger condition being satisfied.

In some implementations, the one or more processors may receive, from the sensor, a measurement identifying an increase in an amount of ambient light inside the package. The amount of ambient light may be the measurable property. Additionally, the one or more processors may determine that the second trigger condition is satisfied by determining that the increase in the amount of ambient light inside the package satisfies a particular threshold change to the ambient light. The particular threshold change to the ambient light may be the threshold change to the measurable property associated with the package. Additionally, the one or more processors may determine that the package has been opened based on the second trigger condition being satisfied.

In some implementations, the one or more processors may determine, before determining that the package has been opened, that a power level of a power source associated with the first device has dropped below a threshold power level. Additionally, the one or more processors may determine a geographic location of the package based on determining that the power level has dropped below the threshold power level. Additionally, the one or more processors may provide, to the remote server, a notification indicating that the power level of the power source has dropped below the threshold power level. The notification may include data identifying the geographic location of the package. Receiving the notification may cause the remote server to execute the activation procedure to verify that the geographic location of the package matches a destination for the package, and may further cause the remote server to automatically activate the second device based on the geographic location of the package matching the destination for the package.

In some implementations, the activation procedure may determine whether the characteristic indicates that the second device has been received by the intended user using at least one of: a first activation procedure to determine whether a geographic location of the package matches an intended delivery location, wherein the characteristic is the geographic location of the package, a second activation procedure to request an authentication code from a particular device associated with the intended user, wherein the characteristic is the authentication code, or a third activation procedure to determine whether voice data of the intended user satisfies a threshold level of similarity with configured voice data of the intended user, wherein the characteristic is the geographic location of the package.

In some implementations, the remote server may receive the characteristic from at least one of: sensor, a second sensor associated with the second device, a particular device associated with the intended user, or a third device that is external to the package.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
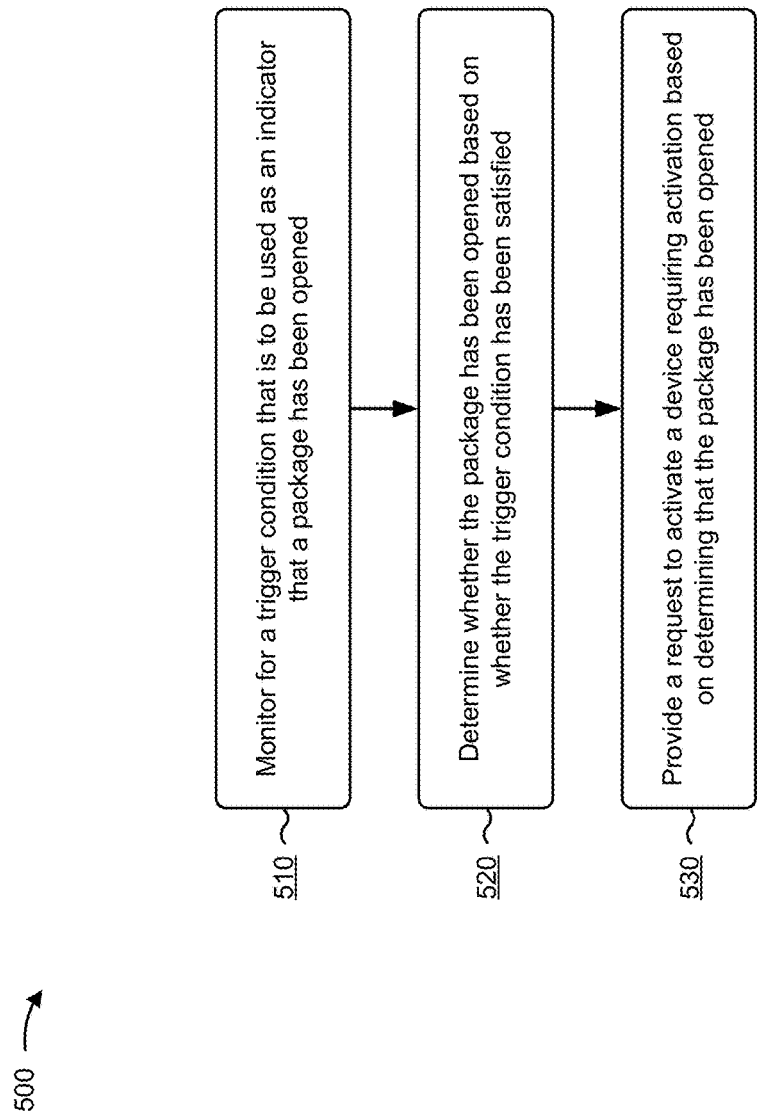
FIG. 5 is a flow chart of an example process for automatically activating a device by detecting a change associated with a package that carries the device.

FIG. 5 is a flow chart of an example process 500 for automatically activating a device by detecting a change associated with a package that carries the device. In some implementations, one or more process blocks of FIG. 5 may be performed by a first device (e.g., activation device 250, using processor 320, input component 350, output component 360, communication interface 370, etc.). In some implementations, one or more process blocks of FIG. 5 may be performed by another device or a group of devices separate from or including the first device, such as a user device (e.g., user device 210), a server device (e.g., server device 220), and/or a second device requiring activation, such as a transaction card (e.g., transaction card 240).

As shown in FIG. 5, process 500 may include monitoring for a trigger condition that is to be used as an indicator that a package has been opened (block 510). For example, the first device may be implemented within a package (e.g., package 230), and may monitor for a trigger condition that is to be used as an indicator that the package has been opened, as described above with respect to FIGS. 1A-1F.

In some implementations, the first device may monitor for the trigger condition with a sensor or with one or more sensing elements associated with one or more processors. In some implementations, the package may be used to transport the second device requiring activation that has been issued to a user.

In some implementations, the trigger condition may be a first trigger condition that is satisfied when a value identifying an amount of an electrical property of a conductive structure sealing the package satisfies a first threshold value. The conductive structure may be communicatively connected to the one or more processors. In some implementations, the trigger condition may be a second trigger condition that is satisfied when a value identifying an amount of a measurable property associated with the package satisfies a second threshold value.

As further shown in FIG. 5, process 500 may include determining whether the package has been opened based on whether the trigger condition has been satisfied (block 520). For example, the first device may determine whether the package has been opened based on whether the trigger condition has been satisfied, as described above with respect to FIGS. 1A-1F.

As further shown in FIG. 5, process 500 may include providing a request to activate the second device (i.e., a device requiring activation) based on determining that the package has been opened (block 530). For example, the first device may provide, to the server device, a request to activate the second device based on determining that the package has been opened, as described above with respect to FIGS. 1A-1F. The request may be provided to the server device via a communication interface to cause the server device to execute an activation procedure to test a characteristic to determine whether the characteristic indicates that the second device has been received by an intended user, and to activate the second device based on whether the activation procedure succeeds.

Process 500 may include additional implementations, such as any single implementation or any combination of implementations described below and/or in connection with one or more other processes described elsewhere herein.

In some implementations, the first device may permit current to flow from a first point in the conductive structure to a second point in the conductive structure. Additionally, the first device may measure, at the second point in the conductive structure and by using the one or more sensing elements, the value identifying the amount of the electrical property associated with the conductive structure. Additionally, the first device may determine that the value identifying the amount of the electrical property satisfies the first threshold value. The value identifying the amount of the electrical property may cause the first trigger condition to be satisfied. Additionally, the first device may determine that the package has been opened based on the first trigger condition being satisfied.

In some implementations, the one or more processors may receive, from the sensor, a value identifying a particular amount of ambient light inside the package. The value identifying the particular amount of ambient light inside the package may be the value identifying the amount of the measurable property associated with the package. Additionally, the one or more processors may determine that the second trigger condition is satisfied by determining that the value identifying the particular amount of ambient light inside the package satisfies a threshold ambient light value. The threshold ambient light value may be the second threshold value. Additionally, the one or more processors may determine that the package has been opened based on the second trigger condition being satisfied.

In some implementations, the first device may detect, using the sensor, a value identifying a volume or intensity level of sound waves within the package. The value identifying the volume or the intensity level of the sound waves within the package may be the value identifying the amount of the measurable property associated with the package. Additionally, the first device may determine that the second trigger condition is satisfied based on determining that the value identifying the volume or intensity level of the sound waves within the package satisfies a threshold volume or intensity value. The threshold volume or intensity value may be the second threshold value. Additionally, the first device may determine that the package has been opened based on the second trigger condition being satisfied.

In some implementations, the characteristic may be a geographic location of the package, and the server device may use the activation procedure to determine whether the geographic location of the package matches an intended delivery location (e.g., a delivery location indicated by the intended user).

In some implementations, the characteristic may be an authentication code received from a particular device associated with the intended user, and the server device may use the activation procedure to validate the authentication code and to activate the second device based on whether validating the authentication code succeeds.

In some implementations, the characteristic may be voice data that has been provided by the first device to the server device, and the server device may execute the activation procedure to compare the voice data and configured voice data of the intended user. In some implementations, the server device may activate the second device based on whether the voice data satisfies a threshold level of similarity with the configured voice data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for automatically activating a device by detecting a change associated with a package that carries the device. In some implementations, one or more process blocks of FIG. 6 may be performed by a device (e.g., activation device 250, using processor 320, input component 350, output component 360, communication interface 370, etc.). In some implementations, one or more process blocks of FIG. 6 may be performed by another device or a group of devices separate from or including the device, such as a user device (e.g., user device 210), a server device (e.g., server device 220), and/or a particular device requiring activation, such as a transaction card (e.g., transaction card 240).

In some implementations, a package (e.g., package 230) may include a holder for the particular device requiring activation that has been issued to a user. The package may be used to transport the particular device requiring activation to a location associated with the user. In some implementations, the package may include the device, which may include a communication interface for communicating to a server device, one or more sensors capable of detecting measurable properties inside the package, one or more memories, and one or more processors, operatively coupled to the one or more memories.

As shown in FIG. 6, process 600 may include receiving values associated with one or more measurable properties that are to be used to determine whether a trigger condition is satisfied (block 610). For example, the device may receive, from the one or more sensors, values associated with one or more measurable properties that are to be used to determine whether a trigger condition is satisfied, as described above with respect to FIGS. 1A-1F. In some implementations, the trigger condition may be used as an indicator that the package has been opened.

As further shown in FIG. 6, process 600 may include determining whether the package has been opened based on whether the trigger condition has been satisfied (block 620). For example, the device may determine whether the package has been opened based on whether the trigger condition has been satisfied, as described above with respect to FIGS. 1A-1F.

As further shown in FIG. 6, process 600 may include providing a request to activate a particular device requiring activation based on determining that the package has been opened (block 630). For example, the device may provide, to the server device and by using the communication interface, a request to activate the particular device based on determining that the package has been opened, as described above with respect to FIGS. 1A-1F. In some implementations, receiving the request may cause the server device to initiate an activation procedure to test a characteristic to determine whether the characteristic indicates that the particular device requiring activation has been received by the user. In some implementations, the server device may activate the particular device requiring activation based on whether the activation procedure succeeds.

Process 600 may include additional implementations, such as any single implementation or any combination of implementations described below and/or in connection with one or more other processes described elsewhere herein.

In some implementations, the one or more sensors may include a light sensor, a motion sensor, a heat sensor, and/or a sound sensor. In some implementations, the holder for the particular device requiring activation may be a conductive structure that is also used to seal the package. In some implementations, the conductive structure may be used to seal the package and may be attached to the particular device requiring activation while the particular device requiring activation is being supported by the holder.

In some implementations, the device may include a location sensor or one or more components capable of determining a geographic location of the package. Additionally, the device may determine a geographic location of the package. Additionally, the device may provide data identifying the geographic location of the package to the server device to allow the server device to execute the activation procedure to compare the data identifying the geographic location and data identifying a destination for the package to verify that the package was delivered to the destination and to activate the particular device requiring activation based on verifying that the package was delivered to the destination.

In some implementations, the device may include a power source, and may determine that the power source has dropped below a threshold power level. Additionally, the device may provide a notification to the server device to allow the server device to implement an alternative transaction card activation procedure.

In some implementations, the device may include a speaker system to provide a message indicating that the particular device requiring activation has been activated. In some implementations, the device may include a display system to provide the message indicating that the particular device requiring activation has been activated.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the activation device is able to intelligently orchestrate activation of the transaction card. Additionally, the activation device conserves processing resources, network resources, and/or memory resources by deterring fraudulent interception of the transaction card. For example, the activation device may deter fraudulent interception of the transaction card by monitoring and reporting a geographic location of the package, by capturing and reporting an image of a portion of the package that has been opened (e.g., if the geographic location is not an address of the transaction card holder), and/or the like. This conserves processing resources that might otherwise be used to generate reports and/or alerts of incidents of fraud, conserves processing resources that might be used to process and/or provide reimbursements relating to incidents of fraud (e.g., to an account of a user that is victim of the fraud), and/or the like.

Additionally, the activation device conserves network resources that might otherwise be used to provide the reports or alerts of incidents of fraud to one or more devices, conserves network resources that might be used to provide reimbursements and/or notifications of reimbursement to one or more devices, and/or the like. Furthermore, the activation device conserves memory resources that might be used to store reports and/or alerts of incidents of fraud, conserves memory resources that might be used to store reimbursement information and/or notifications of reimbursements associated with fraud, and/or the like.

Additionally, because the activation device deters fraudulent interception of the package, the transaction card is able to be delivered to the user by using a package, rather than an envelope, thereby further reducing fraud by eliminating situations where an unauthorized user is able to use carbon paper or a similar material to obtain an imprint of the transaction card identifier. Furthermore, by orchestrating automatic activation of the transaction card, the activation device eliminates a need for the user to have to manually call in to activate the transaction card. This conserves network resources and/or resources that would otherwise be used when the user called in to manually activate the transaction card.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device implemented within a package, the package for transporting a transaction card requiring activation, the first device comprising:
    a sensor for detecting a change to a condition associated with the package;
    a communication interface for communicating information to a remote server;
    one or more memories; and
    one or more processors, communicatively coupled to the one or more memories, to:
        determine whether the package has been opened based on whether a trigger condition is satisfied,
            wherein the trigger condition is:
                a first trigger condition that is satisfied when there is a threshold change to an electrical property of a conductive structure sealing the package,
                    wherein the conductive structure is communicatively connected to the one or more processors, or
                a second trigger condition that is satisfied when there is a threshold change to a measurable property associated with the package; and
        provide, to the remote server via the communication interface, a request to activate the transaction card based on determining that the package has been opened,
            wherein the request includes data that causes the remote server to initiate an activation procedure associated with the transaction card, and
            wherein the request includes an identifier for the transaction card.

2. The first device of claim 1, wherein the first device further comprises a location sensor; and wherein the one or more processors are further to:
    receive, from the location sensor, data identifying a geographic location of the package after determining that the package has been opened,
        wherein determining that the package has been opened causes the location sensor to obtain the data identifying the geographic location of the package and to provide the data identifying the geographic location of the package to the one or more processors; and
    wherein the one or more processors, when providing the request to activate the transaction card, are to:
        provide the request to activate the transaction card to the remote server,
            wherein the request includes the data identifying the geographic location of the package, and
            wherein providing the remote server with the request causes the remote server to execute the activation procedure.

3. The first device of claim 1, wherein the one or more processors, when determining whether the package has been opened, are to:
    permit current to flow through the conductive structure,
    receive, from the sensor, a value indicating an amount of the electrical property associated with the conductive structure,
        wherein the amount of the electrical property is an amount of electrical current flow, an amount of voltage, an amount of resistance, or an amount of capacitance, and
    determine that the value indicating the amount of the electrical property satisfies the threshold change to the electrical property of the conductive structure,
        wherein the threshold change to the electrical property causes the first trigger condition to be satisfied, and
    determine that the package has been opened based on the first trigger condition being satisfied.

4. The first device of claim 1, wherein the one or more processors, when determining whether the package has been opened, are to:
    receive, from the sensor, a measurement identifying an increase in an amount of ambient light inside the package,
        wherein the amount of ambient light inside the package is the measurable property,
    determine that the second trigger condition is satisfied by determining that the increase in the amount of ambient light inside the package satisfies a particular threshold change to the ambient light, wherein the particular threshold change to the ambient light is the threshold change to the measurable property associated with the package, and determine that the package has been opened based on the second trigger condition being satisfied.

5. The first device of claim 1, wherein the one or more processors are further to:

determine, before determining that the package has been opened, that a power level of a power source associated with the first device has dropped below a threshold power level;

determine a geographic location of the package based on determining that the power level has dropped below the threshold power level; and provide, to the remote server, a notification indicating that the power level of the power source has dropped below the threshold power level, wherein the notification includes data identifying the geographic location of the package, and wherein the notification includes data that causes the remote server to execute the activation procedure.

6. The first device of claim 1, wherein the request includes a characteristic associated with the transaction card, the characteristic indicating that the transaction card has been received by an intended user using at least one of:

a first activation procedure to determine whether a geographic location of the package matches an intended delivery location, wherein the characteristic is the geographic location of the package, a second activation procedure to request an authentication code from a particular device associated with the intended user, wherein the characteristic is the authentication code, or a third activation procedure to determine whether voice data of the intended user satisfies a threshold level of similarity with configured voice data of the intended user, wherein the characteristic is the geographic location of the package.

7. The first device of claim 1, wherein the request includes at least one characteristic obtained from at least one of:

the sensor, a second sensor associated with the transaction card, a particular device associated with an intended user, or a second device that is external to the package.

8. A method, comprising:

monitoring, by a first device that is implemented within a package, for a trigger condition that is to be used as an indicator that the package has been opened, wherein the first device monitors for the trigger condition with a sensor or with one or more sensing elements associated with one or more processors, wherein the package is being used to transport a transaction card requiring activation that has been issued to a user, wherein the trigger condition is:

a first trigger condition that is satisfied when a value identifying an amount of an electrical property of a conductive structure sealing the package satisfies a first threshold value, wherein the conductive structure is communicatively connected to the one or more processors, or a second trigger condition that is satisfied when a value identifying an amount of a measurable property associated with the package satisfies a second threshold value;

determining, by the first device, whether the package has been opened based on whether the trigger condition has been satisfied; and providing, by the first device and to a server device, a request to activate the transaction card based on determining that the package has been opened, wherein the request is provided to the server device via a communication interface, wherein the request causes the server device to execute an activation procedure associated with the transaction card.

9. The method of claim 8, wherein determining whether the package has been opened comprises:

permitting current to flow from a first point in the conductive structure to a second point in the conductive structure, measuring, at the second point in the conductive structure and by using the one or more sensing elements, the value identifying the amount of the electrical property associated with the conductive structure, determining that the value identifying the amount of the electrical property satisfies the first threshold value, wherein the value identifying the amount of the electrical property causes the first trigger condition to be satisfied, and determining that the package has been opened based on the first trigger condition being satisfied.

10. The method of claim 8, wherein determining whether the package has been opened comprises:

receiving, by the one or more processors and from the sensor, a value identifying a particular amount of ambient light inside the package, wherein the value identifying the particular amount of ambient light inside the package is the value identifying the amount of the measurable property associated with the package, determining, by the one or more processors, that the second trigger condition is satisfied by determining that the value identifying the particular amount of ambient light inside the package satisfies a threshold ambient light value, wherein the threshold ambient light value is the second threshold value, and determining, by the one or more processors, that the package has been opened based on the second trigger condition being satisfied.

11. The method of claim 8, wherein determining whether the package has been opened comprises:

detecting, using the sensor, a value identifying a volume or intensity level of sound waves within the package, wherein the value identifying the volume or the intensity level of the sound waves within the package is the value identifying the amount of the measurable property associated with the package, determining that the second trigger condition is satisfied based on determining that the value identifying the volume or intensity level of the sound waves within the package satisfies a threshold volume or intensity value, wherein the threshold volume or intensity value is the second threshold value, and determining that the package has been opened based on the second trigger condition being satisfied.

12. The method of claim 8, wherein the request includes a characteristic specifying a geographic location of the package, and wherein the activation procedure is based on the geographic location of the package.

13. The method of claim 8, wherein the request includes a characteristic specifying an authentication code received from a particular device associated with an intended user, and wherein the activation procedure is based on the authentication code.

14. The method of claim 8, wherein the request includes a characteristic specifying voice data that has been provided by the first device to the server device, wherein the activation procedure is based on the voice data.

15. A package, including:
a holder for a transaction card requiring activation that has been issued to a user,
wherein the package is to be used to transport the transaction card requiring activation to a location associated with the user; and
a device, comprising:
a communication interface for communicating to a server device;
one or more sensors capable of detecting measurable properties inside the package;
one or more memories; and
one or more processors, operatively coupled to the one or more memories, to:
receive, from the one or more sensors, values associated with one or more measurable properties that are to be used to determine whether a trigger condition is satisfied,
wherein the trigger condition is to be used as an indicator that the package has been opened,
determine whether the package has been opened based on whether the trigger condition has been satisfied, and
provide, to the server device and by using the communication interface, a request to activate the transaction card based on determining that the package has been opened,
wherein the request includes data that causes the server device to initiate an activation procedure associated with the transaction card.

16. The package of claim 15, wherein the one or more sensors include at least one of:
a light sensor for sensing light within the package,
a motion sensor for sensing motion within the package,
a heat sensor for sensing temperature change within the package, or
a sound sensor for sensing sound within the package.

17. The package of claim 15, wherein:
the holder for the transaction card requiring activation is a conductive structure that is also used to seal the package, or
the conductive structure is used to seal the package and is attached to the transaction card requiring activation while the transaction card requiring activation is being supported by the holder.

18. The package of claim 15, wherein the device further comprises:
a location sensor, or
one or more components capable of determining a geographic location of the package,
wherein the device is further to:
determine the geographic location of the package, and
provide data identifying the geographic location of the package to the server device.

19. The package of claim 15, wherein the device further comprises a power source; wherein the one or more processors are further to:
determine that the power source has dropped below a threshold power level, and
provide a notification to the server device to allow the server device to implement an alternative activation procedure.

20. The package of claim 15, wherein the device further comprises:
a speaker system to provide a message indicating that the transaction card has been activated; or
a display system to provide the message indicating that the transaction card has been activated.

* * * * *